United States Patent
Brück

(10) Patent No.: US 7,985,380 B2
(45) Date of Patent: *Jul. 26, 2011

(54) PARTICULATE TRAP WITH COATED FIBER LAYER AND EXHAUST SYSTEM HAVING THE PARTICULATE TRAP

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 425 days.

This patent is subject to a terminal disclaimer.

(21) Appl. No.: 12/144,963

(22) Filed: Jun. 24, 2008

(65) Prior Publication Data

US 2008/0250775 A1 Oct. 16, 2008

Related U.S. Application Data

(60) Division of application No. 11/146,369, filed on Jun. 6, 2005, now Pat. No. 7,563,414, which is a continuation of application No. PCT/EP03/12455, filed on Nov. 7, 2003.

(30) Foreign Application Priority Data

Dec. 5, 2002 (DE) .................................. 102 57 113

(51) Int. Cl.
*B01D 50/00* (2006.01)
(52) U.S. Cl. ........................................................ 422/180
(58) Field of Classification Search .................. 422/171, 422/177, 180
See application file for complete search history.

(56) References Cited

U.S. PATENT DOCUMENTS

| | | |
|---|---|---|
| 5,403,559 A | 4/1995 | Swars |
| 5,908,480 A | 6/1999 | Ban et al. |
| 6,534,021 B1 | 3/2003 | Maus |
| 6,712,884 B2 | 3/2004 | Brück et al. |
| 6,753,294 B1 | 6/2004 | Brisley et al. |
| 7,055,314 B2 | 6/2006 | Treiber |
| 7,267,805 B2 | 9/2007 | Brück et al. |
| 2003/0072694 A1 | 4/2003 | Hodgson et al. |
| 2004/0013580 A1 | 1/2004 | Bruck et al. |

FOREIGN PATENT DOCUMENTS

| | | |
|---|---|---|
| CA | 1160161 | 1/1984 |
| CN | 1173582 A | 2/1998 |

(Continued)

OTHER PUBLICATIONS

English translation of Japanese Office Action dated Sep. 1, 2009.

(Continued)

*Primary Examiner* — Tom Duong
(74) *Attorney, Agent, or Firm* — Laurence A. Greenberg; Werner H. Stemer; Ralph E. Locher

(57) ABSTRACT

An open particulate trap for purifying exhaust gases from mobile internal combustion engines includes at least one at least partially structured metal foil and at least one high-temperature-resistant fiber layer having metal fibers defining the open particulate trap for purifying exhaust gases from mobile internal combustion engines. The fiber layer has a section and, at least in the section, a catalytically active coating being an SCR catalyst. An exhaust system of an automobile internal combustion engine includes an exhaust pipe defining a flow direction and at least the following components disposed in succession in the flow direction: a reducing-agent feed for supplying liquid urea and the particulate trap.

17 Claims, 4 Drawing Sheets

FOREIGN PATENT DOCUMENTS

| | | | |
|---|---|---|---|
| DE | 3545762 A1 | 7/1987 |
| DE | 89087380 U1 | 10/1989 |
| DE | 19704147 A1 | 8/1998 |
| DE | 20117659 U1 | 2/2002 |
| DE | 20117873 U1 | 3/2002 |
| EP | 0035053 A1 | 9/1981 |
| EP | 0798452 A1 | 10/1997 |
| JP | 9262414 A | 10/1997 |
| WO | 9101178 | 2/1991 |
| WO | 0112320 A1 | 2/2001 |
| WO | 0180978 A1 | 11/2001 |
| WO | 0192692 B2 | 12/2001 |

OTHER PUBLICATIONS

Rolf Brück, et al, "Metal Supported Flow-Through Particulate Trap; a Non-Blocking Solution", International Spring Fuels & Lubricants Meeting & Exhibition, Orlando, FL, May 7-9, 2001, SAE Technical Paper Series 2001-01-1950.

PARTICULATE TRAP WITH COATED FIBER LAYER AND EXHAUST SYSTEM HAVING THE PARTICULATE TRAP

CROSS-REFERENCE TO RELATED APPLICATIONS

This is a divisional application of application Ser. No. 11/146,369, filed Jun. 6, 2005, which is a continuation, under 35 U.S.C. §120, of International Application No. PCT/EP2003/012455, filed Nov. 7, 2003; this application also claims the priority, under 35 U.S.C. §119, of German Patent Application No. 10 257 113.9, filed Dec. 5, 2002; the prior applications are herewith incorporated by reference in their entirety.

BACKGROUND OF THE INVENTION

Field of the Invention

The invention relates to a particulate trap with a coated high-temperature-resistant fiber layer for purifying exhaust gases from automobile internal combustion engines. The invention also relates to an exhaust system of an automobile internal combustion engine having the particulate trap.

If one considers the purification of exhaust gases, in particular from diesel engines, it is known that hydrocarbons (HC) and carbon monoxides (CO) in exhaust gas can be oxidized, for example by bringing them into contact with components which may have a catalytically active surface. However, the reduction of nitrogen oxides (NOx) is more difficult under oxygen-rich conditions. A three-way catalytic converter, as is used, for example, in spark-ignition engines, does not on its own achieve the desired effects for diesel engines. For that reason, by way of example, the selective catalytic reduction (SCR) process has been developed.

Furthermore, storage catalytic converters have been tested for use for the reduction of nitrogen oxides. The coating of a storage catalytic converter contains, in addition to the standard precious metal components, barium carbonate or barium oxide. This makes it possible to store NOx when there is an excess of oxygen. Nitrogen monoxide (NO) from the exhaust gas is oxidized to form nitrogen dioxide ($NO_2$) on the precious metal components. It is then stored on the catalytic converter by forming barium nitrate. During that storage process, a nitrate layer, which slows storage, since $NO_2$ for further storage has to penetrate through that layer, is formed on the barium nucleus. Since the storage capacity is therefore limited, the catalytic converter has to be regenerated at regular intervals. That is effected, for example, by briefly producing a rich exhaust gas, i.e. by operating under substoichiometric conditions for a short period of time. In a reduced atmosphere, the nitrate is converted back into (for example) carbonate and nitrogen monoxide is released. That is immediately reduced to form nitrogen. Since the regeneration takes place more quickly than the storage, the regeneration periods can be significantly shorter than the storage periods.

It is known to use particulate traps which are constructed from a ceramic substrate to reduce particulate emissions. The traps have passages, so that the exhaust gas which is to be purified can flow into the particulate trap. Adjacent passages are alternately closed up, so that the exhaust gas enters the passage on the inlet side, passes through a ceramic wall and escapes again on the outlet side through an adjacent passage. Filters of that type achieve an effectiveness of approximately 95% over the entire range of particulate sizes which occur.

In addition to chemical interactions with additives and special coatings, the reliable regeneration of the filter in the exhaust system of an automobile still presents problems. It is necessary to regenerate the particulate trap, since the increasing accumulation of particulates in the passage walls through which the exhaust gas is to flow leads to a constantly rising pressure loss, which has adverse effects on engine performance. The regeneration step substantially includes brief heating of the particulate trap and the particulates which have accumulated therein, so that the carbon particulates are converted into gaseous constituents. That can also be achieved, for example, by using an upstream exothermic reaction (e.g. oxidation of fuel which has additionally been injected into the exhaust pipe in an oxidation catalytic converter ("after burning")) to ensure that the exhaust gas briefly reaches the temperatures which are sufficient to convert the particulates that are stuck in the particulate trap. However, that high thermal load on the particulate trap has adverse effects on the service life.

In order to avoid the discontinuous regeneration, which in thermal terms leads to a high likelihood of wear, a system for the continuous regeneration of filters has been developed and is known as CRT ("continuous regeneration trap"). In a system of that type, the particulates are burnt at temperatures of over 200° C. through the use of oxidation with $NO_2$. The $NO_2$ required for that purpose is often generated by an oxidation catalytic converter which is disposed upstream of the particulate trap. In that case, however, the problem has arisen, in particular with a view toward use in motor vehicles which use diesel fuel, that there is only an insufficient level of nitrogen monoxide (NO) which can be converted into the desired nitrogen dioxide ($NO_2$) in the exhaust gas. Consequently, it has not heretofore been possible to ensure that the particulate trap will be continuously regenerated in the exhaust system.

It should also be taken into account that in addition to particulates which cannot be converted, oil or additional residues of additives also accumulate in a particulate trap and cannot readily be regenerated. For that reason, known filters have to be replaced and/or washed at regular intervals.

In addition to a minimum reaction temperature and a specific residence time, it is also necessary for sufficient nitrogen oxide to be provided for the continuous regeneration of particulates using $NO_2$. Tests relating to the dynamic emission of nitrogen monoxide (NO) and particulates have clearly demonstrated that the particulates are emitted in particular if there is no nitrogen monoxide or only a very small amount of nitrogen monoxide in the exhaust gas, and vice versa. That means that a filter with real continuous regeneration substantially has the function as a compensator or storage device, so that it is ensured that the two reaction partners are simultaneously present in the required quantities in the filter at a given time. Furthermore, the filter is to be disposed as close as possible to the internal combustion engine, in order to allow it to reach temperatures which are as high as possible immediately after a cold start. In order to provide the required nitrogen dioxide, an oxidation catalytic converter, which reacts carbon monoxide (CO) and hydrocarbons (HC), and in particular also converts nitrogen monoxide (NO) into nitrogen dioxide ($NO_2$), is to be connected upstream of the filter. If that system including an oxidation catalytic converter and a filter is disposed close to the engine, a position upstream of a turbocharger, which is often used in diesel motor vehicles to increase the boost pressure in the combustion chamber, is especially suitable.

Upon looking at those fundamental considerations, the question arises, for actual use in automobile construction, as to how to construct a filter of that type, which in such a position and in the presence of extremely high thermal and dynamic loads, has a satisfactory filter efficiency. In that context, it is necessary to take into account in particular the spatial conditions, which require a new filter layout. Whereas with conventional filters, which were disposed in the underbody of a motor vehicle, the primary factor was to achieve as large a volume as possible, in order to ensure a long residence time of the as yet unconverted particulates in the filter and therefore a high efficiency, with a filter disposed close to the engine, insufficient space or room is available.

In view of those considerations, a new concept has been developed, which is substantially known by the name "open filter system". Such open filter systems are distinguished by the fact that it is possible to dispense with an inbuilt, alternating closure of the filter passages. In that case, the passage walls are constructed at least partially from porous or highly porous material and the flow passages of the open filter have diversion or guide structures. Those internal fittings cause the flow or the particulates contained therein to be deflected toward the regions made from porous or more highly porous material. In that context, surprisingly, it has emerged that the particulates continue to adhere on and/or in the porous passage wall as a result of interception and/or impaction. The pressure differences in the flow profile of the flowing exhaust gas are of importance in connection with the combination of those effects. The diversion may additionally give rise to local subatmospheric or superatmospheric pressure conditions, which lead to a filtration effect through the porous wall, since it is necessary to compensate for the above-mentioned pressure differences.

The particulate trap in that case is open, unlike the known closed screen or filter system, since no flow blind alleys are provided. Therefore, that property can also be used to characterize particulate filters of that type, so that, for example, the parameter "freedom of flow" is suitable for describing such a particulate trap. Therefore, a "freedom of flow" of 20% means that when viewed in cross section it is possible to see all the way through approximately 20% of the surface area. In the case of a particulate filter with a passage density of approximately 600 cpsi (cells per square inch) with a hydraulic diameter of 0.8 mm, this freedom of flow would correspond to a surface area of over 0.1 mm$^2$. In other words, this means that a particulate trap can be referred to as open if particulates can in principle pass all the way through it, specifically including particulates which are considerably larger than the particulates which are actually to be filtered out (in particular the particulate size range which is characteristic of diesel fuel and/or gasoline). As a result, a filter of that type cannot become blocked even in the event of an agglomeration of particulates during operation. A suitable method for measuring the openness of particulate traps is, for example, to test the diameter up to which spherical particulates can still pass through a filter of that type. In current applications, a particulate trap is "open" in particular if spheres with a diameter of greater than or equal to 0.1 mm can still pass through it, preferably spheres with a diameter of over 0.2 mm. "Open" filter elements of that type are known, for example, from German Utility Model DE 201 17 873 U1, corresponding to co-pending U.S. patent application Ser. No. 10/289,088, filed Nov. 6, 2002; German Utility Model DE 201 17 659 U1, corresponding to International Publication No. WO 03/038247; International Publication No. WO 02/00326, corresponding to U.S. Patent Application Publication No. US 2003/097934 A1; International Publication No. WO 01/92692, corresponding to U.S. Patent Application Publication No. US 2003/086837 A1; and International Publication No. WO 01/80978, corresponding to U.S. Patent Application Publication No. US 2003/072694, the contents of the disclosures of which are hereby incorporated in their entirety in the subject matter of the present description.

By way of example, German Utility Model DE 89 08 738 U1, corresponding to U.S. Pat. No. 5,403,559, gives indications as to the general configuration of honeycomb bodies with internal flow-guiding surfaces. That document describes honeycomb bodies, in particular catalyst carrier bodies for motor vehicles, made from metal sheets which are disposed in layers, are structured at least in partial regions and form the walls of a multiplicity of passages through which a fluid can flow. That document states that in most applications and given the standard dimensions of honeycomb bodies of that type, the flow in the passages is substantially laminar, i.e. very small passage cross sections are used. Under those conditions, relatively thick boundary layers, which reduce contact between the core flow in the passages and the walls, are built up on the passage walls. In order to swirl up the exhaust-gas stream inside the passages and thereby ensure intensive contact between the entire exhaust-gas stream and a catalytically active surface of the passages, it is proposed in that document to use protuberances which form surfaces that face the flow in the interior of the passage, so that the exhaust gas is deflected transversely with respect to the main flow direction.

SUMMARY OF THE INVENTION

It is accordingly an object of the invention to provide a particulate trap with a coated fiber layer and an exhaust system having the particulate trap, which overcome the hereinafore-mentioned disadvantages of the heretofore-known devices of this general type, which have improved effectiveness with regard to conversion of pollutants contained in exhaust gas, which provide the possibility of providing exhaust-gas systems having a particularly small structure in particular for automobiles with a diesel engine and in which production, assembly and maintenance of such exhaust-gas systems is significantly simplified and thereby made less expensive.

With the foregoing and other objects in view there is provided, in accordance with the invention, a high-temperature-resistant fiber layer for an open particulate trap for purifying exhaust gases from mobile internal combustion engines. The fiber layer comprises metal fibers, a section and a catalytically active coating disposed at least in the section. A longitudinal section, which is substantially perpendicular to a largest outer surface, has openings formed therein with an average size of 0.01 mm to 0.5 mm, in particular 0.05 mm to 0.25 mm. The catalytically active coating is that of an oxidation catalyst and/or a three-way catalyst and/or an SCR catalyst.

The features disclosed below can be employed individually or in any desired and suitable combination with one another.

The provision of a catalytically active coating of this type has numerous advantages, which will be briefly outlined below. For example, it is possible to ensure that the components for oxidation and/or reduction and/or storage of pollutants contained in the exhaust gas which were originally provided in the exhaust system can be constructed with a smaller volume or can even be dispensed with altogether. This means that the exhaust system per se can have a significantly more streamlined or smaller layout, so that a simple structure, simple maintenance and inexpensive production of the exhaust system become possible. Moreover, surprisingly, synergistic effects are also achieved. For example, exhaust-gas constituents which are helpful to the conversion or elimination of the accumulated particulates are generated directly in the interior of a particulate trap equipped with a fiber layer of this type. These exhaust-gas constituents are therefore produced and provided in the immediate vicinity of the surface of the fiber layer to which the particulates adhere. Therefore, by way of example, it is also possible to considerably reduce the regeneration temperature of the particulate trap, for example from over 900° C. to temperatures below 600° C.

With regard to the configuration of the at least one section of the fiber layer, it should be noted that this section may also extend over the entire surface of the fiber layer. However, it is also possible to provide a plurality of sections, which may be coated and/or in some cases also uncoated, in which case if appropriate it is also possible to select different types of coating, different section shapes or section areas. It is also possible for the at least one section to be located only on one outer surface or outer side of the high-temperature-resistant fiber layer.

With regard to the properties of the coating of an oxidation catalyst, it should be noted that catalysts of this type are used to increase the rate of certain reactions without themselves being consumed. Suitable catalyst substances allow the oxidation reactions for CO (carbon monoxide) and HC (hydrocarbons) in the exhaust gas to take place at lower temperatures. Coatings of this type, which generally contain catalyst substances belonging to the platinum group, allow gaseous hydrocarbons and carbon monoxide to be oxidized at exhaust-gas temperatures in the diesel engine exhaust gas of only 250° C. and above. One particular feature of oxidation coatings of this type is that under certain circumstances the hydrocarbons which still adhere to carbon particulates undergo afterburning, with the result that the particulate emissions can be reduced further. Heretofore, a combination of oxidation-promoting coatings and filter elements of this type has not been provided in a unit, since it was feared that the catalytically active substances would be adversely affected by an increasing coverage with particulates. The present invention ignored this commonly held prejudice in the specialist field and developed a high-temperature-resistant fiber layer which makes it possible to produce particularly effective particulate traps.

If the levels of the three pollutant components CO, HC and NOx (nitrogen oxide) are to be lowered by further reaction, this can be achieved by coating the fiber layer with the coating of a three-way catalyst. The active catalyst substance in this case includes platinum metal (Pt), palladium metal (Pd) and/or rhodium metal (Rh) distributed finely over a large surface area. At a lambda value of 1, CO is oxidized to form carbon dioxide ($CO_2$), CH is oxidized to form $CO_2$ and water ($H_2O$), and NOx is reduced to form nitrogen ($N_2$). In this context, the following coating is recommended for the oxidation catalyst:

Pt/Pd=2/1
0.93-1.2 gram Pt/litercatalyst support volume
0.46-0.6 gram Pt/litercatalyst support volume With regard to the multifunctional catalyst (reduction), it is proposed for the following relationships to apply:

Pt/Rh=5/1
1.16-1.5 gram Pt/litercatalyst support volume
1.23-0.3 gram Rh/litercatalyst support volume The catalyst carrier body volume is to be understood as meaning the volume of the material of the carrier (honeycomb structure, etc.) and the cavities, passages, etc. formed by the carrier.

The coating of an SCR catalyst may, if appropriate, also have a multilayer and/or multistage form. One possible urean SCR catalyst system includes a plurality of partial regions of the coating which are disposed in succession and are applied to the fiber layer. The partial regions may in this case be disposed as follows, as seen in the direction of the flow of the exhaust gas:

a coating of an oxidation catalyst (optional),
the coating of a hydrolysis catalyst,
the coating of an SCR catalyst, and
if appropriate a downstream oxidation catalyst.

The oxidation catalyst which is optionally provided upstream is used to increase the SCR activity at low exhaust-gas temperatures (in particular in the case of a diesel automobile). By increasing the $NO_2$ content (optimum: 50% by vol.) in the exhaust gas through the use of partial oxidation of NO, it is possible to significantly increase the reaction rate of the SCR reaction in a temperature range below approximately 573 K. In addition, carbon monoxide is oxidized to form carbon dioxide and incompletely burnt hydrocarbons are reacted to form carbon dioxide and water at the catalyst surface. If an upstream region with an oxidation coating of this type were not used, the oxidation of the hydrocarbons would take place in part at the SCR catalyst and would therefore reduce the nitrogen oxide conversion rate.

The coating of a hydrolysis catalyst allows an aqueous urea solution to be completely broken down even at low temperatures, for example around 470 K. Decomposition of the urea has proven difficult below approximately 470 K, since undesirable by-products may form due to incomplete decomposition. The coating of the SCR catalyst serves for the selective reduction of the nitrogen oxides NOx with ammonia to form the harmless products nitrogen and water.

In accordance with another feature of the invention, the coating is a washcoat. Coating the relatively smooth surfaces of the fibers with a washcoat causes the catalytically active surface area to be increased. This fissured surface on the one hand ensures that sufficient space is available for fixing a catalyst (e.g. platinum, rhodium, etc.) and on the other hand serves to swirl up the exhaust gas flowing through, effecting particularly intensive contact with the catalyst.

The washcoat layer with a large surface area promoting catalysis is applied in a known way by the fiber layer (or subsequently the entire particulate trap including fiber layers and metal foils) being immersed in a liquid washcoat dispersion or sprayed with such a dispersion. Then, the excess washcoat dispersion is removed, the washcoat in the fiber layer is dried and finally the entire assembly is calcined at temperatures of generally over 450° C. During calcining, the volatile constituents of the washcoat dispersion are expelled, so that a temperature-resistant, catalysis-promoting layer with a high specific surface area is produced. If appropriate, this operation is repeated a number of times in order to achieve a desired layer thickness. The mean layer thickness is preferably in a range from 0.001 to 0.02 mm, in particular between 0.005 and 0.012 mm.

The washcoat usually is formed of a mixture of an aluminum oxide and at least one promoter oxide, such as for example rare-earth oxides, zirconium oxide, nickel oxide, iron oxide, germanium oxide and barium oxide. The washcoat dispersion must have optimum flow properties during its application to the honeycomb body, in order to achieve a desired uniform layer thickness over the entire passage length.

In order to achieve flow properties of this nature, known washcoat dispersions have a specified pH, and only a limited solids content is permitted. However, tests have shown that a washcoat dispersion of this nature has a time-dependent viscosity. This means that the washcoat dispersion very quickly forms a gel, preventing a uniform layer thickness from being generated. This gelation can be delayed by keeping the washcoat dispersion in motion, i.e. moving, in particular vibrating, the dispersion or the filter layer which it wets.

In accordance with a further feature of the invention, the fiber layer is formed of a porous sintered and/or fiber material (e.g. steel). In this context, in particular high-temperature-resistant, corrosion-resistant steels with relatively high chromium, nickel, aluminum and/or molybdenum contents are recommended. In this context, it is particularly advantageous for the fiber layer to include fibers with a mean diameter of less than 0.082 mm, in particular in a range from 0.01 to 0.05 mm.

In accordance with an added feature of the invention, in order to prevent a filter layer of this type from generating a high dynamic pressure in the exhaust-gas stream, it is proposed for the fiber layer to have a porosity of at least 50%, in particular at least 75%, preferably at least 85% and for preference even at least 95%. In this context, it should be noted that fiber layers of this type can be produced relatively successfully using fibers with a mean length of 0.4 mm to 0.05 mm, in which case it is preferable to select shorter fiber lengths for thicker fibers.

At this point, it should be pointed out that the fiber layer may fundamentally include fibers in virtually any desired configuration, and is to be understood as encompassing in particular random layers, woven fabrics or other similar structures. In this case, regular structures may also be present only in regions, whereas a more chaotic configuration of the fibers is present in the remaining regions.

In order to ensure that sufficiently large cavities for particulates and/or their agglomerates are provided, it is proposed herein, in particular for use in exhaust systems of diesel engines, for a certain pore size to be provided. A longitudinal section through the material which shows small cross sections of the pores or cavities, referred to herein as openings, is used to determine the pore size. On average, all of these openings have an extent in the range mentioned above. What is meant in this context is a mean of all of the maximum extents of the openings which can be seen in longitudinal section. Since the dimension of the opening relates to the fiber layer which has already been coated, it is also possible to use a corresponding mean fiber spacing which is preferably to be selected as less than 0.6 mm, in particular between 0.05 mm and 0.35 mm.

In accordance with yet another feature of the invention, the fiber layer has a thickness of less than 3 mm, in particular less than 1.5 mm, preferably less than 0.5 mm and for preference less than 0.1 mm. The thicknesses mentioned herein are selected in particular with a view toward the use of the fiber layer for particulate traps for the purification of exhaust gases from mobile internal combustion engines.

With the objects of the invention in view, there is also provided a particulate trap for purifying exhaust gases from mobile internal combustion engines. The particulate trap comprises a housing, and at least one partially structured metal foil and at least one high-temperature-resistant fiber layer as described above, disposed together in the housing. The at least one partially structured metal foil may be a plurality of structured metal foils, and the at least one high-temperature-resistant fiber layer may be a plurality of fiber layers disposed alternately, in particular wound together, in the housing.

This forms, in particular, an "open" particulate trap, as is described in the introduction hereto. Accordingly, it is especially advantageous to form an "open" filter element as is described in German Utility Model DE 201 17 873 U1, corresponding to co-pending U.S. patent application Ser. No. 10/289,088, filed Nov. 6, 2002; German Utility Model DE 201 17 659 U1, corresponding to International Publication No. WO 03/038247; International Publication No. WO 02/00326, corresponding to U.S. Patent Application Publication No. US 2003/097934 A1; International Publication No. WO 01/92692, corresponding to U.S. Patent Application Publication No. US 2003/086837 A1; and International Publication No. WO 01/80978, corresponding to U.S. Patent Application Publication No. US 2003/072694.

In accordance with another feature of the invention, the particulate trap forms passages running substantially parallel to the axis, with guide surfaces, preferably guide surfaces of the metal foil, projecting into at least some of the passages and diverting gas streams flowing through the passages toward the fiber layer. Guide surfaces of this type may be formed by projections, bosses, micro-undulations, vanes or similar structures. It is also possible for these guide surfaces to be formed by edges of holes in metal foils of this type. The guide surfaces themselves may likewise have holes.

In accordance with a further feature of the invention, the particulate trap has a volume, and the quantity of coating of the particulate trap based on this volume is in a range from 20 to 300 g/l (grams per liter), preferably even between 50 and 120 g/l. In this context, the term volume is to be understood as meaning the volume which is composed of the metal foils, the fiber layers and the passages being formed. A volume of this type is usually in a range from 0.01 l to 1.5 l, preferably between 0.3 l and 0.8 l.

In accordance with a concomitant feature of the invention, the at least one, at least partially structured metal foil has apertures which extend over at least one structure width, preferably even over two, in particular three structure widths. This means that, for example, an aperture of this type connects a plurality of adjacent passages formed by the structure to one another. This ensures particularly effective mixing between the partial exhaust-gas streams without an undesirably high dynamic pressure being generated upstream of the particulate trap. In this context, it should also be noted that the apertures extend substantially in the plane of the metal foil.

Other features which are considered as characteristic for the invention are set forth in the appended claims.

Although the invention is illustrated and described herein as embodied in a particulate trap with a coated fiber layer and an exhaust system having the particulate trap, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
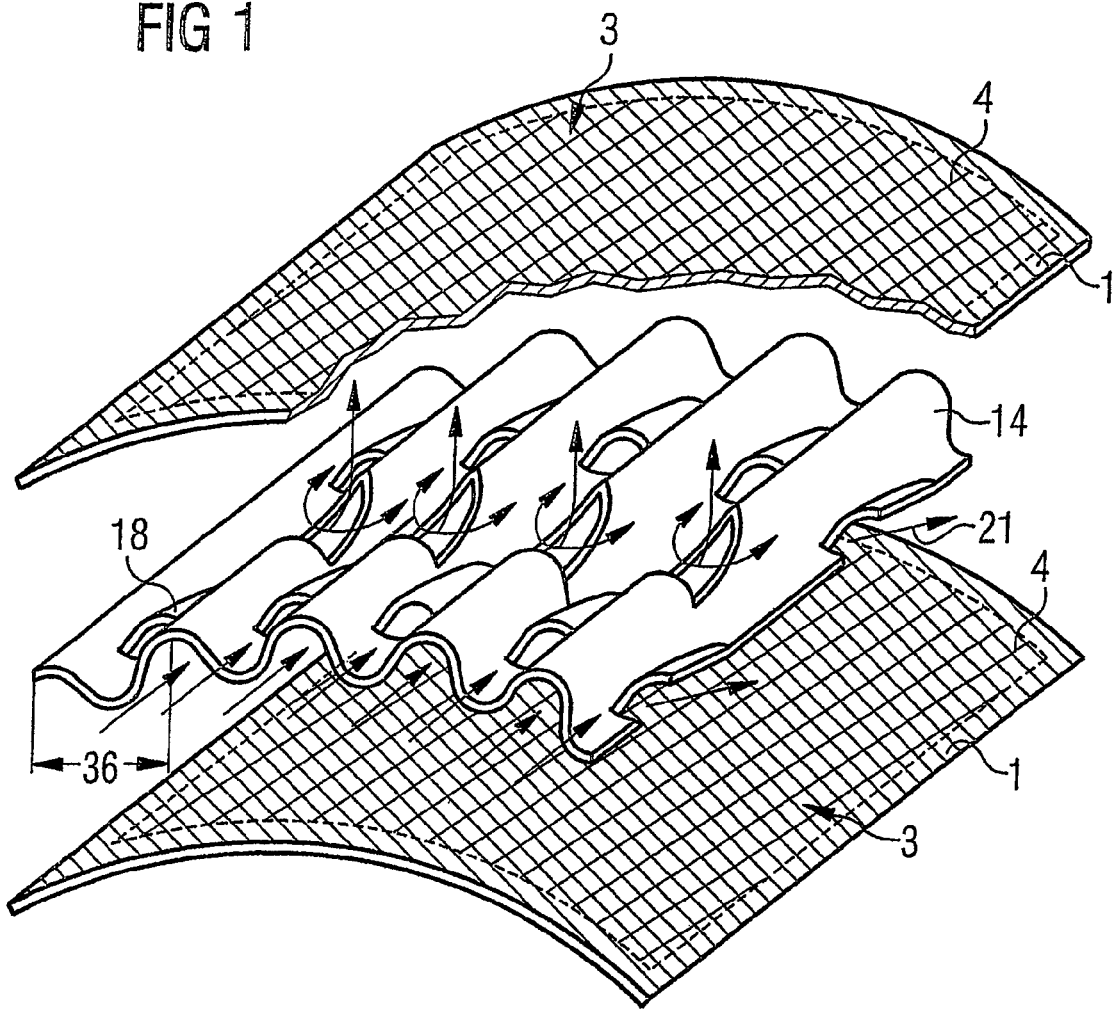
FIG. 1 is a fragmentary, diagrammatic, exploded perspective view of a particulate trap according to the invention.

Referring now to the figures of the drawings in detail and first, particularly, to FIG. 1 thereof, there is seen a fragmentary, diagrammatic, exploded view of a particulate trap as is used, for example, to treat exhaust gas from mobile internal combustion engines. The figure illustrates two fiber layers 1 according to the invention, between which a metal foil 14 is disposed. The fiber layers 1 each have a section 3 in which a coating 4 is disposed. This coating 4 may be the coating of an oxidation catalyst, of a three-way catalyst and/or of an SCR catalyst. It is preferable for the metal foils 14 (at least in partial regions) to have a catalytically active and/or storing coating. It is usual for the adjacent layers to bear against one another, and they are preferably connected to one another by a joining technique, in particular by brazing. For this purpose it is necessary, for example, for a partial region, in particular an edge of the fiber layer 1, not to be coated, in order to ensure that the possibility of forming connections by a joining technique is preserved in this partial region.

Structuring of the metal foil 14 allows an exhaust gas to flow through this "sandwich" of smooth layers (fiber layer 1) and corrugated layer (metal foil 14) in a flow direction 21. Guide surfaces 18 are disposed in passages 17 (shown in FIG. 2), causing partial gas streams to be swirled up, so that they are guided in particular onto the coated fiber layer 1. In this case, the structure of the metal foil 14 is a corrugated structure with a predetermined structure width 36. It is preferable for the guide surfaces 18 and/or apertures 19 (shown in FIG. 2) below to be constructed to be larger than the structure width 36, so that a plurality of adjacent passages 17 can be connected to one another through the apertures 19.

Figure 2:
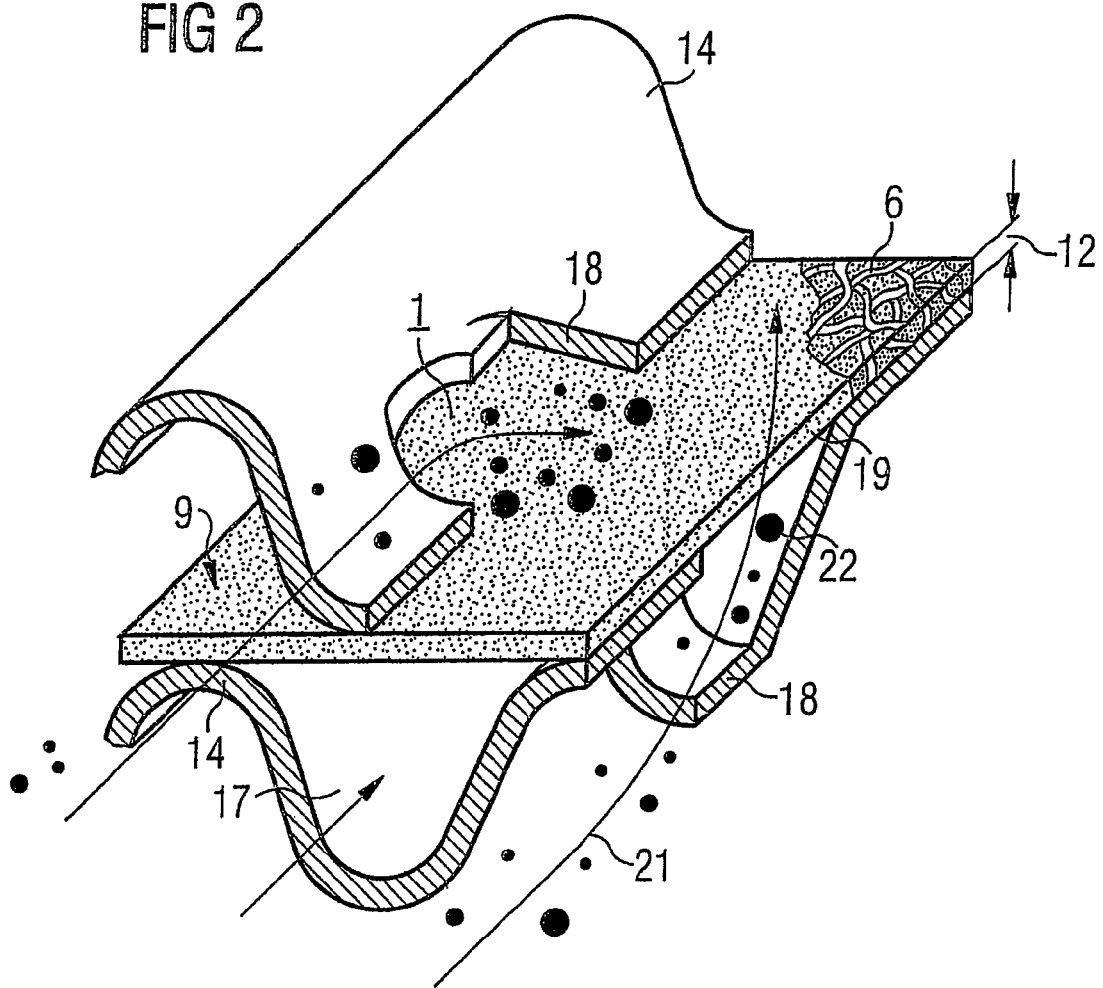
FIG. 2 is an enlarged, fragmentary, perspective view of the particulate trap according to the invention.

FIG. 2 shows a fragmentary illustration of a configuration of metal foils 14 and a fiber layer 1. Once again, the metal foils 14 and the fiber layer 1 are disposed alternately. The structure of the metal foils 14 in combination with the fiber layer 1 forms passages 17 through which the exhaust gas can flow in a flow direction 21. Guide surfaces 18, which are produced from the metal foil 14 itself by stamping, pressing or in some other way, project into the passages 17. This simultaneously creates apertures 19, so that a partial edge flow "peels off" from the gas flowing through a passage 17 and can be diverted toward the fiber layer 1. In this way, particulates 22 are also entrained and guided toward the fiber layer 1, where they remain on an outer surface 9, for example sticking to it or accumulating in cavities, pores or similar openings in the fiber layer 1. The fiber layer 1 illustrated therein has a plurality of chaotically disposed fibers 6 which are provided with a coating 4. Overall, the fiber layer 1 has a thickness 12 of less than 3 mm.

Figure 3:
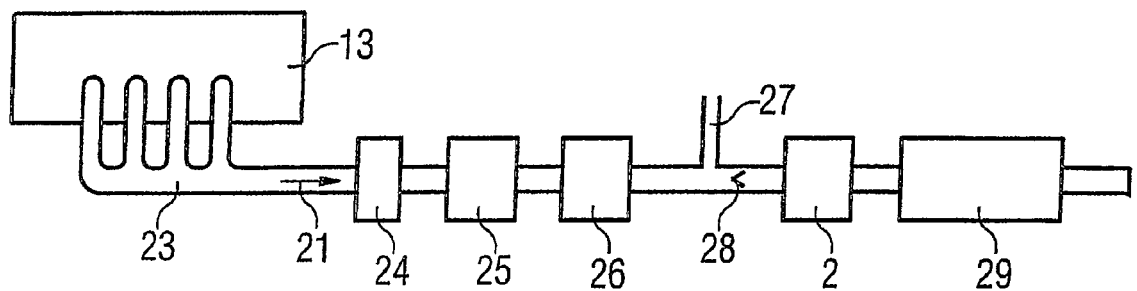
FIG. 3 is a block diagram of a configuration of an exhaust system of a mobile internal combustion engine.

FIG. 3 diagrammatically depicts the structure of an exhaust system of an automobile internal combustion engine 13. Exhaust gas which is generated in the internal combustion engine 13 is fed through an exhaust pipe 23 to numerous components for exhaust-gas treatment before ultimately being released to the environment. The exhaust system illustrated in FIG. 3 includes the following components in succession in the flow direction 21: a starting catalytic converter 24, a turbo charger 25, an oxidation catalytic converter 26, a reducing-agent feed 27, a mixer 28, a particulate trap 2 according to the invention and a main catalytic converter 29.

The starting catalytic converter 24 is distinguished by its particularly small volume (for example less than 0.1 liter) and, due to its low heat capacity and its immediate proximity to the engine, has been heated up sufficiently for it to be possible to catalytically convert pollutants contained in the exhaust gas just a short time after the engine has started (e.g. to temperatures of over 230° C. after a few seconds). The function of the oxidation catalytic converter 26 upstream of a particulate trap 2 for regeneration has already been explained extensively above. The reducing-agent feed 27 and the mixer 28 are used, for example, to supply solid or liquid urea, so that it is also possible to convert pollutants using the SCR method. The mixer 28 may be constructed as a guide surface, a grate, a honeycomb body or in some similar form. However, it is also possible to omit the mixer 28 upstream of the particulate trap 2, since the particulate trap or filter 2 itself is also responsible for swirling up the exhaust-gas stream and/or finely distributing the reducing agent which has been introduced. The downstream main catalytic converter 29 usually has a relatively large volume, in particular of greater than 1.5 liters.

Figure 4:
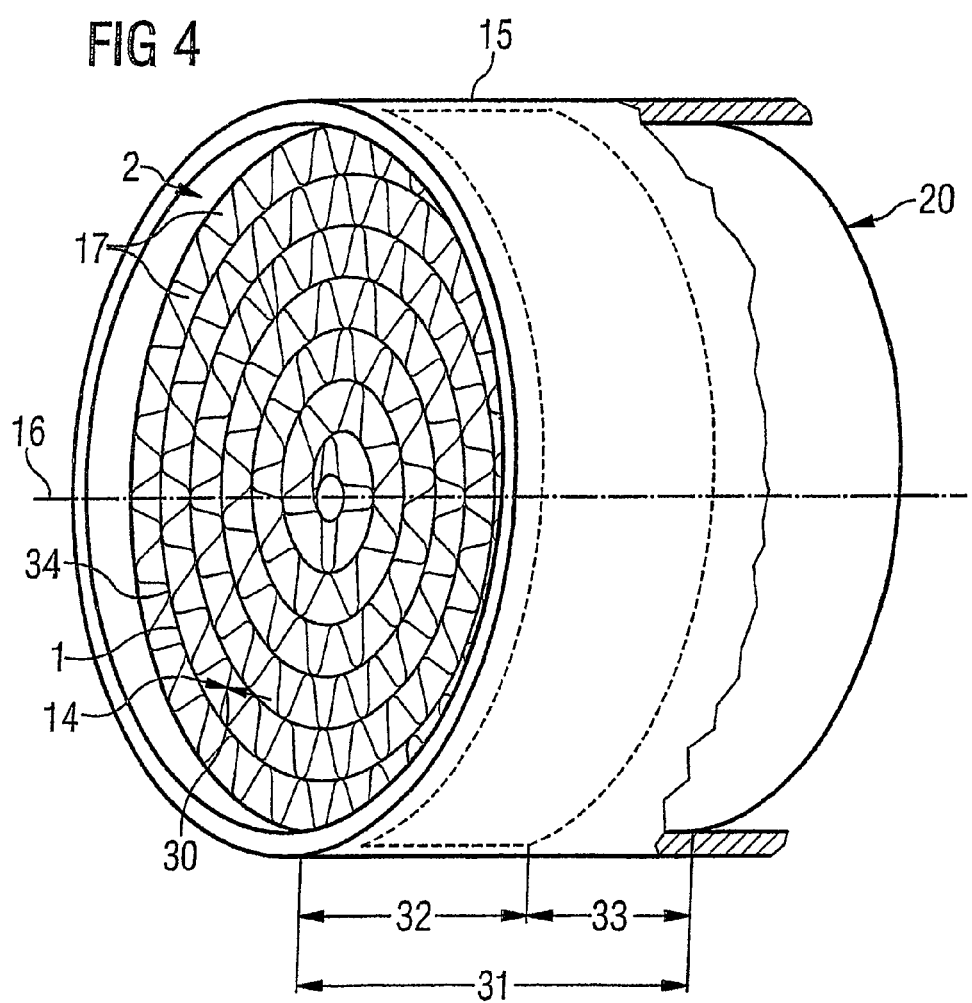
FIG. 4 is a reduced, partly broken-away perspective view of a further configuration of the particulate trap according to the invention.

FIG. 4 shows a perspective and diagrammatic view of the structure of a particulate trap 2. The particulate trap 2 for the purification of exhaust gases from mobile internal combustion engines includes a structured metal foil 14 and a high-temperature-resistant fiber layer 1, which are disposed helically around an axis 16 of the particulate trap 2 (simple stacked configurations, S-shaped loops or other wound configurations of the metal foils and/or fiber layers are also possible as alternatives). The metal foil 14 and the fiber layer 1 form passages 17 which extend through the particulate trap 2 substantially parallel to the axis 16. The assembly including the metal foils 14 and fiber layers 1 is accommodated in a housing 15 and is advantageously also connected to this housing by a joining technique. In the illustrated embodiment of the particulate trap 2, the housing 15 projects beyond an end face 34 of the particulate trap 2 or the metal foil 14 and the fiber layer 1. A material thickness 30 of the corrugated metal foil 14 is preferably in a range below 0.05 mm, preferably even below 0.02 mm. In this context, it is recommended in particular for the material thickness 30 or the non-illustrated coating 4 or other parameters of the particulate trap 2 not to be constant over an entire length 31 of the particulate trap 2. This means, for example, that in a first length section 32, the particulate trap 2 has a lower heat capacity, a higher porosity, a higher loading with regard to the catalytically active coating, a greater number/size of apertures 19, guide surfaces 18 or fibers, than in a second length section 33. In principle, it is also possible for the particulate trap 2 to be divided into more than two length sections.

The illustrated particulate trap 2 has a volume 20 which is characterized by the volume in the interior of the housing 15 that is filled by the fiber layer 1 and the metal foil 14, also encompassing the volume of the passages 17. With regard to the coating 4, the particulate trap according to the invention is provided with a quantity in the range from 20 to 300 g/l. In this context, it is possible for this quantity to be uniformly disposed over the entire length 31 on the outer surfaces 9 of the fiber layer 1 and/or the metal foil 14. However, it is also possible for only the fiber layer 1 or only partial regions of the metal foil 14 to be provided with a catalytically active coating 4. It is also possible for different types or quantities of the coating 4 to be provided in different length sections.

Figure 5:
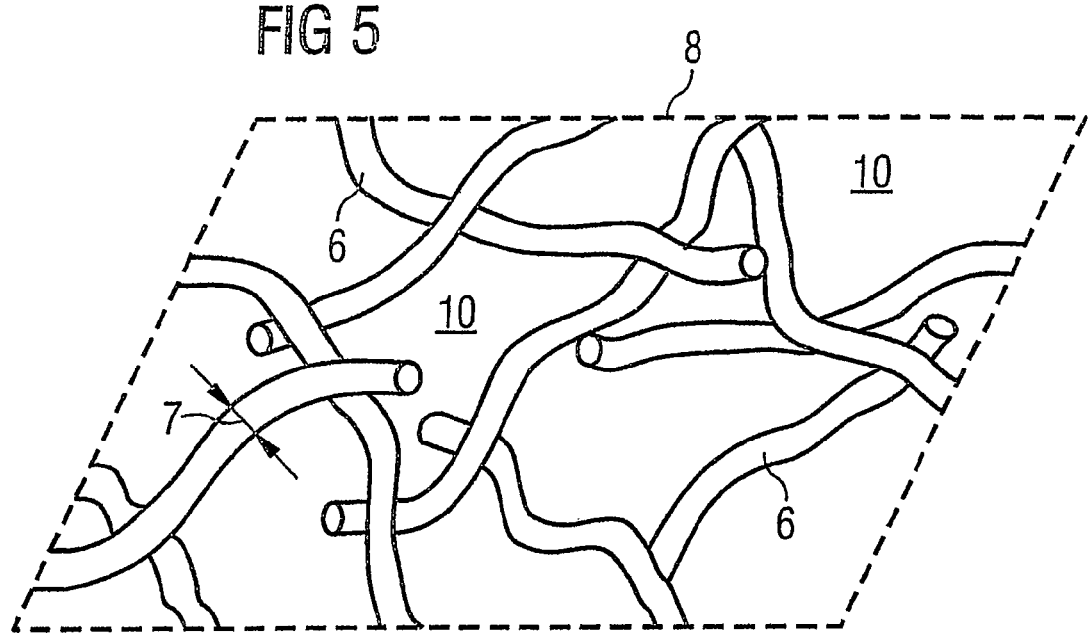
FIG. 5 is a longitudinal-sectional view of a configuration of a fiber layer in accordance with the invention.

FIG. 5 diagrammatically depicts a longitudinal section 8 through the fiber layer 1. In this context, it can be seen that the fiber layer 1 is formed by a multiplicity of fibers 6, which in this case are connected to one another in partially ordered and partially random fashion. The fibers 6 preferably have a diameter 7 in a range from 0.012 to 0.035 mm. Openings 10 are formed by the configuration of the fibers 6 in the longitudinal section 8. These openings in practice constitute a cross section through cavities which are formed in the interior of the fiber layer 1.

Figure 6:
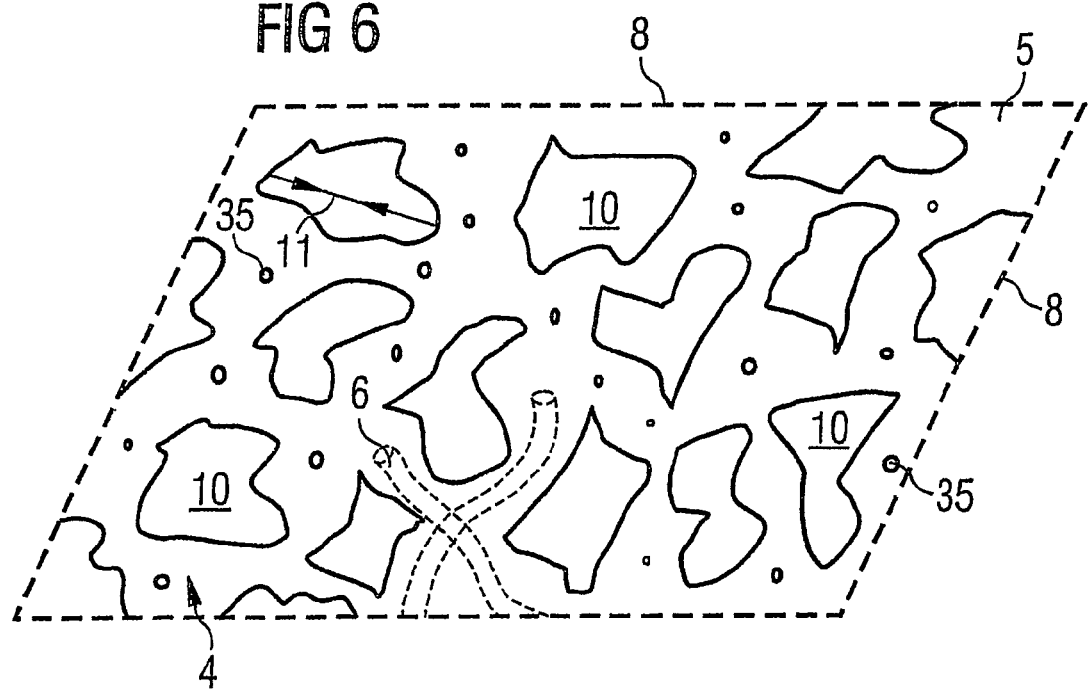
FIG. 6 is a further longitudinal-sectional view of a fiber layer in a coated state.

FIG. 6 likewise diagrammatically depicts a longitudinal section 8 through the fiber layer 1, in which the fibers 6 are provided with a coating 4. The coating 4 is a washcoat 5 which, due to its fissured surface, offers sufficient options for the accumulation of catalytically active substances 35. Despite the coating 4, the longitudinal section 8 still has openings 10 with an extent 11. This extent 11 of all the openings 10 on average is between 0.05 and 0.4 mm. At the same time, it is preferable to maintain a porosity of approximately 87%.

The present invention is the result of a large number of technically complex attempts to improve the efficiency of particulate traps in the exhaust systems of automobile internal combustion engines.

The invention claimed is:

1. An open particulate trap for purifying exhaust gases from mobile internal combustion engines, the particulate trap comprising:
    at least one at least partially structured metal foil; and
    at least one high-temperature-resistant fiber layer having metal fibers defining the open particulate trap for purifying exhaust gases from mobile internal combustion engines;
    said fiber layer having a section and having, at least in said section, a catalytically active coating being an SCR catalyst.

2. The particulate trap according to claim 1, wherein said SCR catalyst has a plurality of partial regions of said coating disposed in succession and applied to said fiber layer.

3. The particulate trap according to claim 2, wherein said partial regions include a coating of a hydrolysis catalyst followed by a coating of an SCR catalyst, as seen in exhaust gas flow direction.

4. The particulate trap according to claim 3, which further comprises a coating of an oxidation catalyst disposed at least upstream of said coating of a hydrolysis catalyst or downstream of said coating of an SCR catalyst.

5. The particulate trap according to claim 1, which further comprises a housing, said at least one structured metal foil and said at least one fiber layer including a plurality of structured metal foils and a plurality of fiber layers disposed alternately and wound together in said housing.

6. The particulate trap according to claim 1, wherein said at least one structured metal foil and said at least one fiber layer define an axis of the particulate trap and passages extending substantially parallel to said axis, said at least one structured metal foil having guide surfaces projecting into at least some of said passages and diverting gas streams flowing through said passages toward said fiber layer.

7. The particulate trap according to claim 1, wherein the particulate trap has a volume, and said coating is present in a quantity relative to said volume having a range of from 20 to 300 g/l (grams per liter).

8. The particulate trap according to claim 1, wherein said at least one at least partially structured metal foil has a structure width and apertures extending at least over said structure width.

9. The particulate trap according to claim 1, wherein said coating is a washcoat.

10. The particulate trap according to claim 1, wherein said fiber layer is formed of at least one of a porous sintered material or a fiber material.

11. The particulate trap according to claim 1, wherein said fiber layer includes fibers with a mean diameter less than 0.082 mm.

12. The particulate trap according to claim 1, wherein said fiber layer has a porosity of at least 50%.

13. The particulate trap according to claim 11, wherein said fiber layer has a porosity of at least 95%.

14. The particulate trap according to claim 1, wherein said fiber layer has a largest outer surface and a longitudinal section substantially perpendicular to said largest outer surface, said longitudinal section having openings formed therein with an average size of 0.05 mm to 0.5 mm.

15. The particulate trap according to claim 1, wherein said fiber layer has a thickness of less than 3 mm.

16. The particulate trap according to claim 1, wherein said fiber layer has a thickness of less than 0.5 mm.

17. An exhaust system of an automobile internal combustion engine, the exhaust system comprising:
    an exhaust pipe defining a flow direction; and
    at least the following components disposed in succession in said flow direction:
        a reducing-agent feed for supplying liquid urea; and
        a particulate trap according to claim 1.

* * * * *